June 12, 1934.    A. H. STRONG    1,962,532
AIR CONDITIONING APPARATUS
Filed July 6, 1931
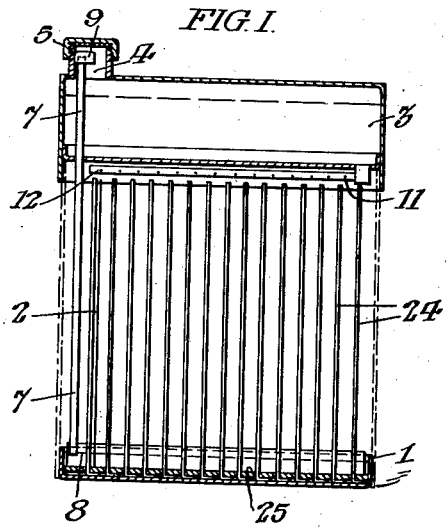
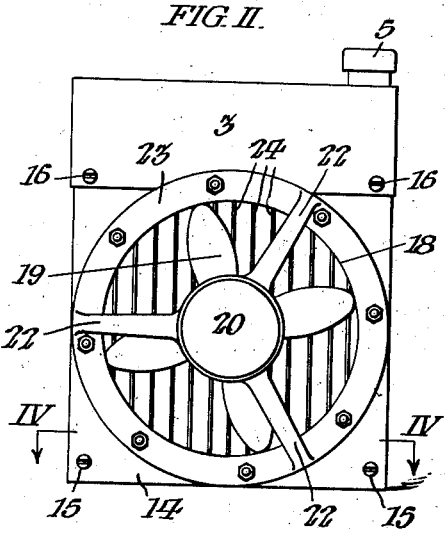
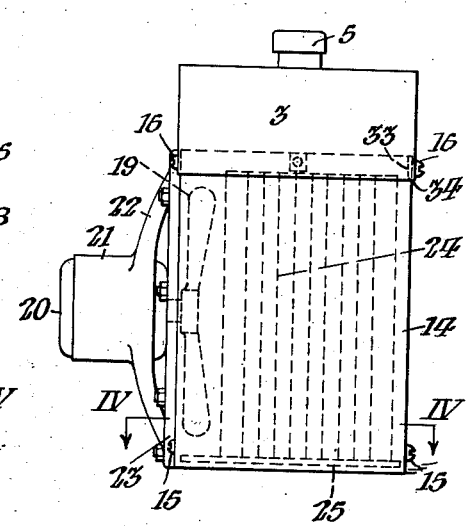
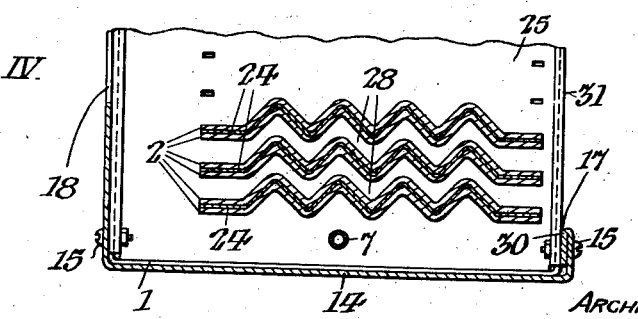
INVENTOR:
ARCHIE HUGH STRONG,
BY Patented June 12, 1934

1,962,532

UNITED STATES PATENT OFFICE 1,962,532

AIR CONDITIONING APPARATUS

Archie Hugh Strong, Conshohocken, Pa., assignor to John Wood Manufacturing Company, Inc., Conshohocken, Pa., a corporation of Delaware Application July 6, 1931, Serial No. 548,767

1 Claim. (Cl. 261—103)

My invention relates to apparatus of the type wherein atmospheric air is caused to traverse a moist surface, preferably of absorbent material containing water, with the effect of purifying the air by depositing dust and other foreign matter therefrom upon the moist surface traversed by it; thereby vaporizing the water and increasing the humidity of the air and materially cooling it. The water thus used may have in solution or suspension any other substance with which it is desired to treat the air, for instance, a disinfectant or a perfume.

It is characteristic of the form of my invention chosen for illustration that the supply of water to the surfaces to be traversed by the air, is automatically regulated and controlled in accordance with the rate of dissipation of the moisture from said surfaces which, of course, varies with the humidity of the atmosphere being treated. Such control is effected by tension of a confined atmosphere above the supply of water in a reservoir from which the water is permitted to gravitate to said surfaces only when that confined atmosphere is in communication with the outer atmosphere through a conduit which is closed by the water discharged from said reservoir when such discharged water reaches a predetermined level in a receptacle to which the water gravitates.

In the form of my invention chosen for illustration, the surface traversed by the air to be conditioned is disposed below said water reservoir and above said receptacle and the surfaces are formed by wick material which extends into the receptacle and is of such character as to lift water therefrom by capillary attraction; the arrangement being such that the water from the reservoir trickles upon said absorbent material which is disposed substantially vertical and gravitates down such material into the receptacle, filling the latter to a predetermined level at which the conduit leading to the reservoir is closed by the water thus discharged from the reservoir, thus temporarily stopping the discharge of water. During the intervals between such gravitative discharges of the water from the reservoir into said receptacle, said absorbent material is moistened by water elevated from said receptacle solely by capillary attraction; such discharge being resumed only when the water has been vaporized to such an extent as to lower the level of the discharged water in the receptacle and uncover the lower end of said conduit. Consequently, the rate of discharge of water from the reservoir is automatically determined by the rate of vaporization of the water from the surfaces traversed by the air.

In the most complex form of my invention herein disclosed, an electrically operative fan is used to forcibly circulate the air with respect to the moist surfaces.

My invention includes the various novel features of construction and arrangement hereinafter more definitely specified.

In said drawing: Fig. I is a vertical sectional view of a form of my invention including the automatic water feeding means.

Fig. II is a rear elevation of an apparatus embodying the elements of Fig. I in conjunction with an electrically operative fan for forcibly circulating the air.

Fig. III is a side elevation of the structure shown in Fig. II.

Fig. IV is a fragmentary plan sectional view taken on the line IV, IV, in Figs. II and III but on a larger scale.

Referring to Fig. I, the water receptacle 1 is open at the top and exposed to the atmosphere. The web of water absorbent material, preferably a textile web fabric 2, dips at its lower end into said water receptacle, extends above the latter, and is also exposed to the atmosphere. The water reservoir 3 has the inlet 4 through which it may be charged with water but is provided with the closure 5, conveniently a screw cap, by which it may be hermetically closed. Means constructed and arranged to automatically control the supply of water to said receptacle 1 from said reservoir 3, in accordance with the rate of evaporation of water from said receptacle and said wick material 2, include the air conduit 7 which extends from a predetermined level 8 in said water receptacle 1 to the upper part of said water reservoir 3, conveniently terminating in said inlet 4, to the side of which it is fixed in connection with a cap 9 which overhangs the upper end of said conduit 7 and prevents ingress of water thereto during the operation of charging said reservoir 3 with water through said inlet 4. Said means for controlling the discharge of water from said reservoir 3 also include the conduit 11 extending from the bottom of said reservoir 3, preferably horizontally, above said wick element 2 and having a perforation 12 from which water may drip upon said wick element 2.

The construction and arrangement shown in Fig. I are such that when the lower end of said air conduit 7 is open and said reservoir 3 charged with water, the water is discharged by gravity through said perforation 12, saturates said wick element 2 and subsides into said receptacle 1 until it reaches the level of the lower end of said air conduit 7 and closes the latter. Thereupon, a partial vacuum is formed in the upper part of said tank 3 and the discharge of water through said perforation 12 stopped by the pressure of the outer atmosphere. However, as soon as the water evaporates from said receptacle 1 enough to uncover the lower end of said air conduit 7, the outer atmosphere is admitted through said conduit to the upper portion of said reservoir 3 and the discharge of water resumed until the lower end of said conduit is again closed by the water accumulating in said receptacle 1. Consequently, the supply of water to said wick element is automatically controlled and varied in accordance with the rate of evaporation of water.

Referring to Figs. II to IV inclusive, the water receptacle 1 is detachably secured in the bottom of the casing 14, conveniently by the screws 15. The water reservoir 3 forms the top of said casing 14 to which it is detachably secured, conveniently by the screws 16. Said casing 14, which has the rectangular opening 17 at the front thereof, has, at the back thereof, the circular opening 18, through which the outer atmospheric air may be forcibly circulated, by any convenient means.

I find it convenient to circulate the air through said casing 14 by means of the fan 19 driven by the electric motor 20, the frame 21 of which has three spider arms 22 in unitary relation with the ring 23 by which said frame is detachably rigidly connected with said casing 14. Said fan 19 may be turned in either direction, to either compress the air into said casing 14 or exhaust it therefrom.

I prefer to support said wick material 2 upon a series of wick plates 24 mounted in vertical position and in parallel spaced relation, with their lower ends extending into said water receptacle 1. Said plates are preferably rigidly connected with a frame plate 25 which rests upon the bottom of said receptacle 1; so that they may be removed together to be cleaned. As indicated in Fig. IV; I prefer to corrugate each of said plates 24 so as to form a series of rectangular panels therein; the corrugations upon adjoining plates being intermeshed, in spaced relation, affording tortuous air passageways 28, between the adjoining plates.

Although said wick material 2 is preferably in the form of a textile web fabric; it may be otherwise formed, for instance, by string wound around said plates 24, and the latter may be otherwise constructed and arranged.

The four pieces forming the inclosure for said wick material, to wit, the bottom receptacle 1, top reservoir 3, and casing 14, may be formed of primarily plane sheet metal, preferably tinned copper. As indicated, the front edges of the casing 14 may be folded at 30 to form reinforced vertical frame members at opposite sides of the rectangular opening 17. The top edge of said receptacle 1 may be folded at 31 to form a similar reinforced bottom frame member for said opening 17. The bottom flange 33 on said reservoir 3 may be similarly folded at 34 to form a reinforced top frame member for said opening 17. However, said casing may be otherwise formed and arranged.

Therefore, I do not desire to limit myself to the precise details of construction and arrangement herein set forth, as it is obvious that various modifications may be made therein without departing from the essential features of my invention, as defined in the appended claim.

I claim:

Air conditioning apparatus including a casing; a water receptacle in the bottom of said casing; a series of water absorbent elements extending in said receptacle and upwardly therefrom in said casing; a water reservoir in said casing above said water absorbent elements; a water discharge conduit leading from said reservoir, extending above said water absorbent elements, and having perforations from which water may drip upon the respective elements; means automatically controlling the discharge of water from said perforations, including an air conduit independent of and remote from said water discharge conduit and extending from a predetermined level in said receptacle to the upper portion of said water reservoir; and means adapted to hermetically close said reservoir; whereby water is permitted to escape through the perforations of said conduit intermittently and only when the interior of said reservoir is in communication with the outer atmosphere, and such communication is shut off and the discharge of water terminated when the discharged water reaches said predetermined level in said receptacle and closes the lower end of said air conduit; whereby said absorbent elements are moistened by water elevated from said receptacle solely by capillary attraction, during the intervals when the gravitation of water from said reservoir is thus prevented, and the length of said intervals determined by the rate of evaporation of water from said receptacle and absorbent elements.

ARCHIE HUGH STRONG.